United States Patent [19]

Ohtomo

[11] Patent Number: 5,248,335
[45] Date of Patent: Sep. 28, 1993

[54] PIGMENT COMPOSITION AND ITS USE

[75] Inventor: Yoshitaka Ohtomo, Tokyo, Japan

[73] Assignee: Toyo Ink Manufacturing Co., Ltd., Tokyo, Japan

[21] Appl. No.: 836,843

[22] Filed: Feb. 19, 1992

[30] Foreign Application Priority Data

Feb. 26, 1991 [JP] Japan .................................. 3-53909
Feb. 26, 1991 [JP] Japan .................................. 3-53910
Feb. 26, 1991 [JP] Japan .................................. 3-53911

[51] Int. Cl.$^5$ ............................................ C09B 63/00
[52] U.S. Cl. ................................. 106/402; 106/30 R; 106/496; 106/500
[58] Field of Search ............... 106/402, 496, 500, 501

[56] References Cited

FOREIGN PATENT DOCUMENTS 62-187776 8/1987 Japan .

Primary Examiner—Mark L. Bell
Assistant Examiner—Margaret Einsmann
Attorney, Agent, or Firm—Wenderoth, Lind & Ponack

[57] ABSTRACT

A pigment composition which shows a low viscosity even when prepared into a high-concentration dispersion and is therefore free from a decrease in gloss and tinting strength, the composition containing 100 parts by weight of a monoazo lake pigment obtained from β-oxynaphthoic acid or β-naphthol as a coupler component and an aromatic diamine having a water-soluble group as a diazo component, and 0.3 to 20 parts by weight of at least one compound selected from the group consisting of compounds of the formulae (1), (2) and (3),

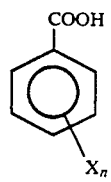 (1)

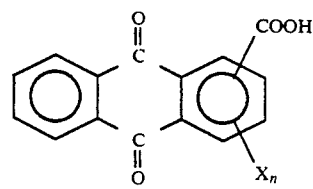

(2)

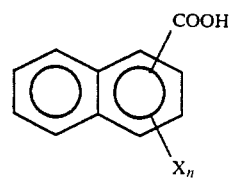

(3)

wherein X is independently a halogen atom, an alkyl group having 1 to 4 carbon atoms, an alkoxy group having 1 to 4 carbon atoms, carboxyl, a nitro group, an amino group or hydroxyl, and n is an integer of 0 to 7; and a pigment dispersion containing the above pigment composition.

5 Claims, No Drawings

PIGMENT COMPOSITION AND ITS USE

FIELD OF THE INVENTION

The present invention relates to a pigment composition which shows a low viscosity even in a dispersion having a high pigment concentration and which is also excellent in gloss and clearness, and also relates to a pigment dispersion. More specifically, it relates to a pigment composition and a pigment dispersion particularly useful for a gravure printing ink.

PRIOR ART OF THE INVENTION

Printing inks such as a gravure ink and coating compositions are generally composed of a vehicle resin, a pigment, a solvent, an additive, and the like. A pigment dispersion containing a rosin-based resin, shellac, polyamide, a vinyl resin, a urethane resin, nitrocellulose, cyclized rubber or a chlorinated rubber as a vehicle is used in a printing ink.

For example, a gravure ink is produced by mixing a pigment and a vehicle to form an ink mixture having a pigment content of about 10% by weight and diluting the ink mixture with a solvent to form an ink having a viscosity suitable for printing. To reduce the costs for manufacture, transportation, etc., however, there is a recent trend toward producing an ink by preparing a high-concentration pigment dispersion having a pigment content of about 25% by weight and diluting it.

However, in a pigment dispersion containing a monoazo lake pigment obtained from β-oxynaphthoic acid or β-naphthol as a coupler component, a high-concentration pigment dispersion having a pigment concentration of about 25% by weight shows a decrease in performances such as the viscosity and tinting strength as compared with a pigment dispersion having a pigment concentration of about 10% by weight. That is, with an increase in the pigment content in the pigment dispersion, pigment particles aggregate to a greater extent, and due to this, the viscosity of the pigment dispersion increases. When pigment particles once aggregate to increase the viscosity, a larger amount of a diluent is required to adjust the viscosity of the pigment dispersion to make the dispersion suitable for printing. As a result, the gloss and tinting strength decrease.

To overcome the above problem, there has been conventionally employed a method in which an additive is incorporated or the pigment is surface-treated. For example, JP-A-62-187776 discloses a pigment dispersion containing β-oxynaphthoic acid as an additive. This pigment dispersion shows an improvement to some extent, but is practically not satisfactory. Further, the use of an additive inevitably adds an extra step to the production of a pigment dispersion and increases the cost.

SUMMARY OF THE INVENTION

It is an object of the present invention to provide a pigment composition which is free from an increase in the viscosity even when prepared into a high-concentration dispersion and which is therefore free from a decrease in gloss and tinting strength when used in an ink.

It is another object of the present invention to provide a pigment dispersion containing the above pigment composition.

According to the present invention, there is provided a pigment composition containing 100 parts by weight of a monoazo lake pigment obtained from β-oxynaphthoic acid or β-naphthol as a coupler component and an aromatic diamine having a water-soluble group as a diazo component, and 0.3 to 20 parts by weight of at least one compound selected from the group consisting of compounds of the formulae (1), (2) and (3),

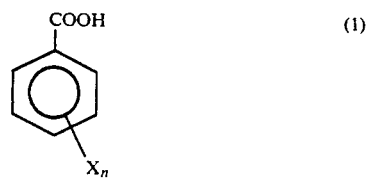

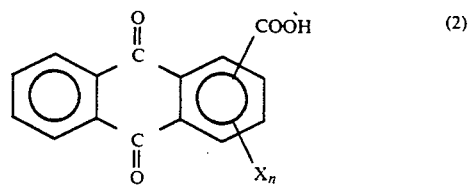

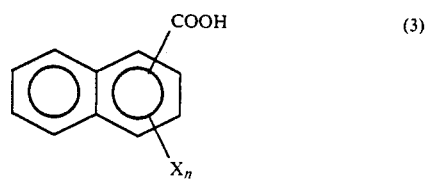

wherein X is independently a halogen atom, an alkyl group having 1 to 4 carbon atoms, an alkoxy group having 1 to 4 carbon atoms, carboxyl, a nitro group, an amino group or hydroxyl, and n is an integer of 0 to 7.

Further, according to the present invention, there is also provided a pigment dispersion comprising the above pigment composition in a vehicle prepared by dissolving a resin in an organic solvent.

DETAILED DESCRIPTION OF THE INVENTION

In the monoazo lake pigment used in the present invention, the diazo component is an aromatic amine having a water-soluble group. The aromatic amine includes 1-amino-4-methylbenzene-2-sulfonic acid, 1-amino-4-methyl-5-chlorobenzene-2-sulfonic acid, 1-aminonaphthalene-1-sulfonic acid and 1-amino-4-chloro-5-methylbenzene-2-sulfonic acid.

The coupler component includes β-naphthol, β-oxynaphthoic acid and β-oxynaphthoic acid having a substituent such as a lower alkyl group, an alkoxy group or a halogen atom. In addition, a small amount of a naphthol AS type coupler component may be used in combination.

Typical examples of the pigments obtained from the above diazo component and coupler component include Brilliant Carmine 6B type pigments obtained by coupling a diazo component prepared mainly from p-toluidine-m-sulfonic acid and a coupler component prepared mainly from β-oxynaphthoic acid and forming the resultant product into a lake pigment with a metal salt such as calcium chloride, or the like.

The metal of the metal salt used in the above lake formation includes calcium, barium, strontium, magnesium, zinc and manganese. The above-obtained pigment may be surface-treated with rosin, etc.

The resin for the vehicle used in the pigment dispersion of the present invention includes gum rosin, wood rosin, tall oil rosin, rosin ester, lime hardened rosin, zinc hardened rosin, maleinated rosin, fumarated rosin, nitrocellulose, ethylcellulose, polyamide, polyurethane, cyclized rubber and chlorinated rubber. These resins may be used alone or in combination. Of these resins, preferred are rosin-based resins having a high effect in a pigment dispersion having a high pigment concentration and nitrocellulose.

The organic solvent used in the present invention includes aromatic hydrocarbons, aliphatic hydrocarbons, esters and ketones. These organic solvents may be used alone or in combination. Preferred are toluene, xylene, ethyl acetate, acetone, n-hexane and isopropyl alcohol.

The compound of the formula (1) includes benzoic acid, salicylic acid, tert-butylbenzoic acid, phthalic acid, trimellitic acid, p-aminobenzoic acid, anthranilic acid, 4-nitro-anthranilic acid, m-aminobenzoic acid and p-methylbenzoic acid. These compounds may be used alone or in combination. The compound of the formula (2) includes anthraquinone-$\beta$-carboxylic acid, anthraquinone-2-oxy-3carboxylic acid, anthraquinone-2-oxy-carboxylic acid, anthraquinone-2,3-dicarboxylic acid, anthraquinone-4-nitro-2-carboxylic acid, anthraquinone-3-methyl-1-carboxylic acid and anthraquinone-2-amino-1-carboxylic acid. These compounds may be used alone or in combination. The compound of the formula (3) includes 3-carboxynaphthalene, 2-amino-1-naphthalenecarboxylic acid, 1,3-dicarboxynaphthalene, 4-nitro-2-aminonaphthalenecarboxylic acid and 1-carboxy-3-methylnaphthalene. These compounds may be used alone or in combination. Further, the compounds of the formulae (1), (2) and (3) may be used alone or in combination. The amount of the compound(s) selected from the compounds of the formulae (1), (2) and (3) for use per 100 parts by weight of the pigment is 0.3 to 20 parts by weight, preferably 1 to 10 parts by weight.

The pigment composition of the present invention can be produced by mixing the monoazo lake pigment with the above compound according to a conventional method.

When the pigment dispersion is produced, the above compound(s) may be incorporated into the pigment before, during or after the mixing of the pigment and the vehicle prepared from the resin and the organic solvent. It is the most preferable to incorporate the above compound(s) while the pigment and the vehicle are mixed, since the effect of reducing the viscosity is easily exhibited. When the amount of the above compound(s) is less the above lower limit, the effect of reducing the viscosity is poor. When this amount exceeds the above upper limit, the tinting strength undesirably decreases.

The pigment dispersion of the present invention is produced by kneading and milling the composition containing vehicle (the organic solvent and the resin), the pigment and at least one compound selected from the compounds of the formulae (1) to (3) with any one of kneading and milling machines such as a ball mill, a sand mill, a pebble mill, etc., optionally after preliminarily mixing the above components.

The pigment dispersion may be adjusted to a concentration so that it can be directly used as a printing ink or a coating composition. On the other hand, the pigment dispersion may be prepared as a concentrate base having a high concentration, and the concentrate base is preferred to decrease the costs for the production and transportation. The pigment concentration in the pigment dispersion is generally 5 to 70% by weight. The pigment dispersion of the present invention has its characteristic feature in that it is free from an increase in the viscosity and a decrease in the gloss and tinting strength even if it has a high pigment concentration, e.g., 20% by weight or more. The pigment dispersion of the present invention may contain other additives usually used for the production of printing inks and coating compositions.

A printing ink obtained from the pigment dispersion of the present invention shows a remarkable improvement concerning the defects such as a decrease in the tinting strength, a change in the color tone, a decrease in the gloss, opacification and defective flowability and particularly concerning such defects as thickening and gelation which occur when inks are stored for a long period of time. In particular, a high-concentration gravure ink obtained from the pigment dispersion of the present invention is characteristically free from such defects as an increase in the viscosity, defective gloss and defective clearness. Moreover, there is an advantage that the pigment composition and the pigment dispersion of the present invention obviate a specially costly method using the surface treatment or modification of a pigment to decrease the viscosity.

The present invention will be described more in detail by reference to Examples, in which "part" and "%" stand for "part by weight" and "% by weight" unless otherwise specified.

EXAMPLE 1 AND COMPARATIVE EXAMPLE 1

100 Grams of a mixture consisting of 15.5% of a Brilliant Carmine 6B type pigment (Lionol Red 6BFG-4297G, supplied by Toyo Ink Manufacturing Co., Ltd.), 0.7% of benzoic acid, 54.2% of a lime rosin varnish (consisting of 55% of rosin and 45% of toluene) and 29.6% of toluene was charged into a 225 ml glass bottle together with 180 g of 3 mm $\phi$ steel balls, and dispersed with a paint conditioner for 40 minutes to obtain an ink (to be referred to as "a base ink" hereinafter). Toluene for adjustment of the resultant ink to a printing viscosity was added to a mixture of 44.8 parts of the base ink and 32 parts of a lime rosin varnish to obtain a gravure ink (Example 1). For comparison, the above procedure was repeated except that no benzoic acid was added to obtain a base ink and a gravure ink (Comparative Example 1). Each base ink was measured for a viscosity (unit: cps) with a Brookfield rotational viscometer. Each gravure ink was developed over a coat paper sheet, and the developed ink was measured with a glossmeter (60-degree reflectance), and its clearness was visually examined. Table 1 shows the viscosity of each base ink and the printing result of each gravure ink.

TABLE 1

| | Viscosity of base ink (6/60 rpm. cps) | Gloss (%) | Clearness |
|---|---|---|---|
| CEx-1 | 3,100/1,036 | 63.5 | standard |
| Ex-1 | 550/317 | 69.6 | excellent |

Ex = Example. CEx = Comparative Example

EXAMPLE 2 AND COMPARATIVE EXAMPLE 2

100 Grams of a mixture consisting of 28.8% of a Brilliant Carmine 6B type pigment (the same as that used in Example 1), 1.2% of benzoic acid and 70% of a lime rosin varnish (consisting of 30% of rosin and 70% of toluene) was charged into a 225 ml glass bottle together with 200 g of 3 mm φ steel balls, and dispersed with a paint conditioner for 90 minutes to obtain a base ink. Toluene for adjustment of the resultant ink to a printing viscosity was added to a mixture of 35 parts of the base ink and 65 parts of a lime rosin varnish to obtain a gravure ink (Example 2). For comparison, the above procedure was repeated except that the benzoic acid was replaced with βoxynaphthoic acid in the same amount as that of the benzoic acid to obtain a base ink and a gravure ink (Comparative Example 2). These base inks and gravure inks were evaluated in the same manner as in Example 1. Table 2 shows the results.

TABLE 2

|  | Viscosity of base ink 6/60 rpm. cps) | Gloss (%) | Clearness |
|---|---|---|---|
| CEx-2 | 650/470 | 46.4 | standard |
| Ex-2 | 510/305 | 51.9 | excellent |

Ex = Example. CEx = Comparative Example

EXAMPLES 3-6 AND COMPARATIVE EXAMPLE 3

Example 2 was repeated except that the lime rosin varnish was replaced with a mixed solvent (consisting of 90% of toluene, 5% of xylene and 5% of n-hexane) and that the benzoic acid was replaced with salicylic acid in amounts shown in Table 3 to obtain base inks. Each base ink was measured for a viscosity in the same manner as in Example 1. Table 3 shows the results.

TABLE 3

|  | Amount of salicylic acid* | Viscosity of base ink (6/60 rpm. cps) |
|---|---|---|
| CEx-3 | 0 | 3.100/1,036 |
| Ex-3 | 0.5 | 2.620/890 |
| Ex-4 | 1 | 1.100/490 |
| Ex-5 | 2 | 660/350 |
| Ex-6 | 4 | 550/317 |

Ex = Example. CEx = Comparative Example
*Amount per 100 parts of pigment

EXAMPLE 7

A base ink was prepared in the same manner as in Example 2 except that benzoic acid was added after the preparation of the dispersion (containing no benzoic acid) and that the resultant mixture was stirred. The base ink was measured with a Brookfield rotational viscometer for a viscosity at 6/60 rpm to show 600/350 cps.

EXAMPLE 8 AND COMPARATIVE EXAMPLE 4

100 Grams of a mixture consisting of 9.5% of a Brilliant Carmine 6B type pigment (the same as that used in Example 1), 0.2% of tert-butylbenzoic acid, 68% of a nitrocellulose varnish (solid content 55%, toluene/ethyl acetate/isopropyl alcohol solution=55/26/19), 2.9% of a plasticizer (DBP) and 19.4% of a solvent (ethyl acetate/acetone=95/5) was treated in the same manner as in Example 1 to obtain a base ink (Example 8). The base ink was measured with a Brookfield rotational viscometer for a viscosity at 6/60 rpm to show 600/540 cps. The above procedure was repeated except that no tert-butylbenzoic acid was added to obtain a base ink (Comparative Example 4). This base ink was measured with a Brookfield rotational viscometer for a viscosity at 6/60 rpm to show 5,800/3,850 cps.

Gravure inks were prepared from the above two base inks in the same manner as in Example 1 except that a nitrocellulose varnish was used in place of the lime rosin varnish. The gravure inks were evaluated on the gloss and clearness in the same manner as in Example 1. The gravure ink obtained from the base ink obtained in Example 8 showed improved gloss and clearness over the gravure ink obtained from the base ink obtained in Comparative Example 4.

EXAMPLES 9 AND 10 AND COMPARATIVE EXAMPLES 5 AND 6

A base ink (Example 9) was prepared from a mixture consisting of 9.7% of a Brilliant Carmine 6B type pigment (the same as that used in Example 1), 0.3% of tert-butylbenzoic acid, 77% of a polyamide-nitrocellulose varnish (solid content 37.7%), 3% of a plasticizer (DBP) and 10% of a solvent (toluene/ethyl acetate/isopropyl alcohol/methanol=6/2/1/1) in the same manner as in Example 1. A base ink (Example 10) was also prepared from a mixture consisting of 9.8% of a Brilliant Carmine 6B type pigment (the same as that used in Example 1), 0.2% of tert-butylbenzoic acid, 72% of a cyclized rubber varnish (solid content 50%, toluene solution), 3% of a plasticizer (DBP) and 15% of a solvent (toluene/n-hexane=95/5) in the same manner as in Example 1. Further, base inks (Comparative Examples 5 and 6) were prepared from the above mixtures in the same manner as in Example 1 except that no tert-butylbenzoic acid was used. Each of these base inks was measured for a viscosity with a Brookfield rotational viscometer to show that the viscosities of the base inks obtained in Examples 9 and 10 were respectively about ½ of those of base inks obtained in Comparative Examples 5 and 6.

Gravure inks were prepared from the above four base inks in the same manner as in Example 1 except that a polyamide-nitrocellulose varnish or a cyclized rubber varnish was used in place of the lime rosin varnish. The gravure inks were evaluated on the gloss and clearness in the same manner as in Example 1. The gravure inks obtained from the base inks obtained in Examples 9 and 10 showed excellent gloss and clearness over the gravure inks obtained from the base inks obtained in Comparative Examples 5 and 6.

As described above, the present invention provides a pigment composition which can retain a low viscosity without aggregation of pigment particles even if it has a high pigment concentration, e.g., 20% or more, and further provides a pigment dispersion containing this pigment composition. Moreover, the present invention provides a pigment composition which can give a printing ink free from a decrease in the gloss, tinting strength and clearness when adjusted to a proper printing viscosity, and further provides a pigment dispersion containing this pigment composition.

EXAMPLE 11 AND COMPARATIVE EXAMPLE 7

100 Grams of a mixture consisting of 15.5% of a Brilliant Carmine 6B type pigment (the same as that used in Example 1), 0.7% of anthraquinone-β-carboxylic acid, 54.2% of a lime rosin varnish (consisting of 55% of rosin and 45% of toluene) and 29.6% of toluene was charged into a 225 ml glass bottle together with 180 g of 3 mmφ steel balls, and dispersed with a paint conditioner for 40 minutes to obtain a base ink. Toluene for adjustment of the resultant ink to a printing viscosity was added to a mixture of 44.8 parts of the base ink and 32 parts of a lime rosin varnish to obtain a gravure ink (Example 11). For comparison, the above procedure was repeated except that no anthraquinone-β-carboxylic acid was added to obtain a base ink and a gravure ink (Comparative Example 7).

When each of the above base inks was measured for a viscosity with a Zahn cup #3, the base ink obtained in Example 11 showed 16 seconds, while the base ink obtained in Comparative Example 7 showed 26 seconds. Further, when a printing test was carried out with each of the above gravure inks, the print by the gravure ink obtained in Example 11 showed a gloss (60-degree reflectance) of 49.3%, while the print by the gravure ink obtained in Comparative Example 7 showed a gloss of 41.1%. Furthermore, the print by the gravure ink obtained in Example 11 had excellent clearness over the print by the gravure in obtained in Comparative Example 7.

EXAMPLE 12 AND COMPARATIVE EXAMPLE 8

100 Grams of a mixture consisting of 28.8% of a Brilliant Carmine 6B type pigment (the same as that used in Example 1), 1.2% of anthraquinone-β-carboxylic acid and 70% of a lime rosin varnish (consisting of 30% of rosin and 70% of toluene) was charged into a 225 ml glass bottle together with 200 g of 3 mmφ steel balls, and dispersed with a paint conditioner for 90 minutes to obtain a base ink. Toluene for adjustment of the resultant ink to a printing viscosity was added to a mixture of 35 parts of the base ink and 65 parts of a lime rosin varnish to obtain a gravure ink (Example 12). For comparison, the above procedure was repeated except that the anthraquinone-β-carboxylic acid was replaced with β-oxynaphthoic acid in the same amount as that of the anthraquinone-β-carboxylic acid to obtain a base ink and a gravure ink (Comparative Example 8). These base inks and gravure inks were evaluated in the same manner as in Example 1. Table 4 shows the results.

TABLE 4

| | Viscosity of base ink (6/60 rpm, cps) | Gloss (%) | Clearness |
|---|---|---|---|
| CEx-8 | 650/470 | 41.1 | standard |
| Ex-12 | 600/330 | 46.8 | excellent |

Ex = Example, CEx = Comparative Example

EXAMPLES 13-16 AND COMPARATIVE EXAMPLE 9

Example 12 was repeated except that the toluene in the lime rosin varnish was replaced with a mixed solvent (consisting of 90% of toluene, 5% of xylene and 5% of n-hexane) and that the anthraquinone-β-carboxylic acid was replaced with anthraquinone-2-oxy-3-carboxylic acid (to be sometimes referred to as "AQ23" hereinafter) in amounts shown in Table 5 to obtain base inks. Each base ink was measured for a viscosity in the same manner as in Example 1. Table 5 shows the results.

TABLE 5

| | Amount of AQ23* | Viscosity of base ink (6/60 rpm, cps) |
|---|---|---|
| CEx-9 | 0 | 3,100/1,036 |
| Ex-13 | 0.5 | 2,500/900 |
| Ex-14 | 1 | 1,100/490 |
| Ex-15 | 2 | 650/400 |
| Ex-16 | 4 | 700/405 |

Ex = Example, CEx = Comparative Example
*Amount per 100 parts of pigment

EXAMPLE 17

A base ink was prepared in the same manner as in Example 12 except that anthraquinone-β-carboxylic acid was added after the preparation of the dispersion (containing no anthraquinone-β-carboxylic acid) and that the resultant mixture was stirred. The base ink was measured with a Brookfield rotational viscometer for a viscosity at 6/60 rpm to show 650/400 cps.

EXAMPLE 18 AND COMPARATIVE EXAMPLE 10

100 Grams of a mixture consisting of 9.8% of a Brilliant Carmine 6B type pigment (the same as that used in Example 1), 0.2% of anthraquinone-4-nitro-carboxylic acid, 67% of a nitrocellulose varnish (solid content 55%, toluene/ethyl acetate/isopropyl alcohol solution = 55/26/19), 3% of a plasticizer (DBP) and 20% of a solvent (ethyl acetate/acetone = 95/5) was treated in the same manner as in Example 1 to obtain a base ink (Example 18). The base ink was measured with a Brookfield rotational viscometer for a viscosity at 6/60 rpm to show 1,200/850 cps. The above procedure was repeated except that no anthraquinone-4-nitro-2-carboxylic acid was added to obtain a base ink (Comparative Example 10). This base ink was measured with a Brookfield rotational viscometer for a viscosity at 6/60 rpm to show 6,500/3,900 cps.

Gravure inks were prepared from the above two base inks in the same manner as in Example 1 except that a nitrocellulose varnish was used in place of the lime rosin varnish. The gravure inks were evaluated on the gloss and clearness in the same manner as in Example 1. The gravure ink obtained from the base ink obtained in Example 18 showed improved gloss and clearness over the gravure ink obtained from the base ink obtained in Comparative Example 10.

EXAMPLES 19 AND 20, AND COMPARATIVE EXAMPLES 11 AND 12

A base ink (Example 19) was prepared from a mixture consisting of 9.8% of a Brilliant Carmine 6B type pigment (the same as that used in Example 1), 0.2% of anthraquinone-4-nitro-2-carboxylic acid, 80% of a polyamide-nitrocellulose varnish (solid content 37.7%), 10% of a solvent (toluene/ethyl acetate/isopropyl alcohol/methanol = 6/2/1/1) in the same manner as in Example 1. A base ink (Example 20) was also prepared from a mixture consisting of 9.8% of a Brilliant Carmine 6B type pigment (the same as that used in Example 1), 0.2% of anthraquinone-4-nitro-2-carboxylic acid, 60% of a cyclized rubber varnish (solid content 50%, toluene solution) and 30% of toluene in the same manner as in Example 1. Further, base inks (Comparative Examples 11 and 12) were prepared from the above mixtures in the same manner as in Example 1 except that no anthraquinone-4-nitro-2-carboxylic acid was used. Each of these base inks was measured for a viscosity with a Brookfield rotational viscometer to show that the viscosities of the base inks obtained in Examples 19 and 20 were respectively about ½ of those of base inks obtained in Comparative Examples 11 and 12.

Gravure inks were prepared from the above four base inks in the same manner as in Example 1 except that a polyamide-nitrocellulose varnish and a cyclized rubber varnish were used in place of the lime rosin varnish. The gravure inks were evaluated on the gloss and clearness in the same manner as in Example 1. The gravure inks obtained from the base inks obtained in Examples 19 and 20 showed excellent gloss and clearness over the gravure inks obtained from the base inks obtained in Comparative Examples 11 and 12.

As described above, the present invention provides a pigment composition which can retain a low viscosity without aggregation of pigment particles even if it has a high pigment concentration, e.g., 20% or more, and further provides a pigment dispersion containing this pigment composition. Moreover, the present invention provides a pigment composition which can give a printing ink free from a decrease in the gloss, tinting strength and clearness when adjusted to a proper printing viscosity, and further provides a pigment dispersion containing this pigment composition.

EXAMPLE 21 AND COMPARATIVE EXAMPLE 13

100 Grams of a mixture consisting of 15.5% of a Brilliant Carmine 6B type pigment (the same as that used in Example 1), 0.7% of 3-carboxynaphthalene, 54.2% of a lime rosin varnish (consisting of 55% of rosin and 45% of toluene) and 29.6% of toluene was charged into a 225 ml glass bottle together with 180 g of 3 mmφ steel balls, and dispersed with a paint conditioner for 40 minutes to obtain a base ink. Toluene for adjustment of the resultant ink to a printing viscosity was added to a mixture of 44.8 parts of the base ink and 32 parts of a lime rosin varnish to obtain a gravure ink (Example 21). For comparison, the above procedure was repeated except that no 3-carboxynaphthalene was added to obtain a base ink and a gravure ink (Comparative Example 13).

When each of the above base inks was measured for a viscosity with a Zahn cup #3, the base ink obtained in Example 21 showed 15 seconds, while the base ink obtained in Comparative Example 13 showed 26 seconds. Further, when a printing test was carried out with each of the above gravure inks, the print by the gravure ink obtained in Example 21 showed a gloss (60-degree reflectance) of 51.9%, while the print by the gravure ink obtained in Comparative Example 13 showed a gloss of 41.1%. Furthermore, the print by the gravure ink obtained in Example 21 had excellent clearness over the print by the gravure in obtained in Comparative Example 13.

EXAMPLE 22 AND COMPARATIVE EXAMPLE 14

100 Grams of a mixture consisting of 28.8% of a Brilliant Carmine 6B type pigment (the same as that used in Example 1), 1.2% of 3-carboxynaphthalene and 70% of a lime rosin varnish (consisting of 30% of rosin and 70% of toluene) was charged into a 225 ml glass bottle together with 200 g of 3 mmφ steel balls, and dispersed with a paint conditioner for 90 minutes to obtain a base ink. Toluene for adjustment to a printing viscosity was added to a mixture of 35 parts of the base ink and 65 parts of a lime rosin varnish to obtain a gravure ink (Example 22). For comparison, the above procedure was repeated except that the 3-carboxynaphthalene was replaced with β-oxynaphthoic acid in the same amount as that of the 3-carboxynaphthalene to obtain a base ink and a gravure ink (Comparative Example 14). These base inks and gravure inks were evaluated in the same manner as in Example 1. Table 6 shows the results.

TABLE 4

|  | Viscosity of base ink (6/60 rpm, cps) | Gloss (%) | Clearness |
|---|---|---|---|
| CEx-14 | 650/470 | 46.8 | standard |
| Ex-22 | 560/306 | 51.9 | excellent |

Ex = Example, CEx = Comparative Example

EXAMPLES 23-26 AND COMPARATIVE EXAMPLE 15

Example 22 was repeated except that the toluene in the lime rosin varnish was replaced with a mixed solvent (consisting of 90% of toluene, 5% of xylene and 5% of n-hexane) and that the 3-carboxynaphthalene was replaced with 1,3-dicarboxynaphthalene (to be sometimes referred to as "13DCN" hereinafter) in amounts shown in Table 7 to obtain base inks. Each base ink was measured for a viscosity in the same manner as in Example 1. Table 7 shows the results.

TABLE 7

|  | Amount of 13DCN* | Viscosity of base ink (6/60 rpm, cps) |
|---|---|---|
| CEx-15 | 0 | 3,100/1,036 |
| Ex-23 | 0.5 | 2,620/890 |
| Ex-24 | 1 | 1,100/490 |
| Ex-25 | 2 | 600/350 |
| Ex-26 | 4 | 810/403 |

Ex = Example, CEx = Comparative Example
*Amount per 100 parts of pigment

EXAMPLE 27

A base ink was prepared in the same manner as in Example 22 except that 3-carboxynaphthalene was added after the preparation of the dispersion (containing no 3-carboxynaphthalene) and that the resultant mixture was stirred. The base ink was measured with a Brookfield rotational viscometer for a viscosity at 6/60 rpm to show 600/350 cps.

EXAMPLE 28 AND COMPARATIVE EXAMPLE 16

100 Grams of a mixture consisting of 9.8% of a Brilliant Carmine 6B type pigment (the same as that used in Example 1), 0.2% of 2-amino-1-naphthalenecarboxylic acid, 67% of a nitrocellulose varnish (solid content 55%, toluene/ethyl acetate/isopropyl alcohol solution=55/26/19), 3% of a plasticizer (DBP) and 20% of a solvent (ethyl acetate/acetone=95/5) was treated in the same manner as in Example 1 to obtain a base ink (Example 28). The base ink was measured with a Brookfield rotational viscometer for a viscosity at 6/60 rpm to show 1,020/740 cps. The above procedure was repeated except that no 2-amino-1-naphthalenecarboxylic acid was added to obtain a base ink (Comparative Example 16). This base ink was measured with a Brookfield rotational viscometer for a viscosity at 6/60 rpm to show 5,800/3,850 cps.

Gravure inks were prepared from the above two base inks in the same manner as in Example 1 except that a nitrocellulose varnish was used in place of the lime rosin varnish. The gravure inks were evaluated on the gloss and clearness in the same manner as in Example 1. The gravure ink obtained from the base ink obtained in Example 28 showed improved gloss and clearness over the gravure ink obtained from the base ink obtained in Comparative Example 16.

EXAMPLES 29 AND 30, AND COMPARATIVE EXAMPLES 17 AND 18

A base ink (Example 29) was prepared from a mixture consisting of 9.8% of a Brilliant Carmine 6B type pigment (the same as that used in Example 1), 0.2% of 2-amino-1-napthalenecarboxylic acid, 80% of a polyamidenitrocellulose varnish (solid content 37.7%), 10% of a solvent (toluene/ethyl acetate/isopropyl alcohol/methanol=6/2/1/1) in the same manner as in Example 1. A base ink (Example 30) was also prepared from a mixture consisting of 9.8% of a Brilliant Carmine 6B type pigment (the same as that used in Example 1), 0.2% of 2-amino-1-naphthalenecarboxylic acid, 60% of a cyclized rubber varnish (solid content 50%, toluene solution) and 30% of toluene in the same manner as in Example 1. Further, base inks (Comparative Examples 17 and 18) were prepared from the above mixtures in the same manner as in Example 1 except that no 2-amino-1-naphthalenecarboxylic acid was used. Each of these base inks was measured for a viscosity with a Brookfield rotational viscometer to show that the viscosities of the base inks obtained in Examples 29 and 30 were respectively about ½ of those of base inks obtained in Comparative Examples 17 and 18.

Gravure inks were prepared from the above four base inks in the same manner as in Example 1 except that a polyamide-nitrocellulose varnish or a cyclized rubber varnish was used in place of the lime rosin varnish. The gravure inks were evaluated on the gloss and clearness in the same manner as in Example 1. The gravure inks obtained from the base inks obtained in Examples 29 and 30 showed excellent gloss and clearness over the gravure inks obtained from the base inks obtained in Comparative Examples 17 and 18.

As described above, the present invention provides a pigment composition which can retain a low viscosity without aggregation of pigment particles even if it has a high pigment concentration, e.g., 20% or more, and further provides a pigment dispersion containing this pigment composition. Moreover, the present invention provides a pigment composition which can give a printing ink free from a decrease in the gloss, tinting strength and clearness when adjusted to a proper printing viscosity, and further provides a pigment dispersion containing this pigment composition.

What is claimed is:

1. A pigment composition containing 100 parts by weight of a monoazo lake pigment obtained from β-oxynaphthoic acid or β-naphthol as a coupler component and an aromatic diamine having a water-soluble group as a diazo component, and 0.3 to 20 parts by weight of at least one compound selected from the group consisting of compounds of the formulae (1), (2) and (3),

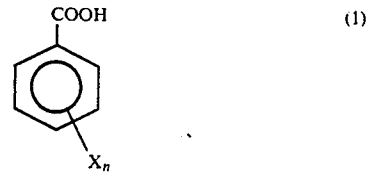

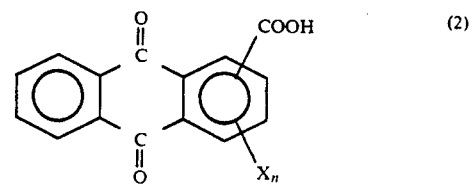

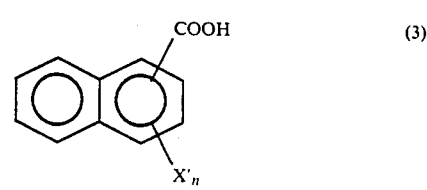

wherein X is independently a halogen atom, an alkyl group having 1 to 4 carbon atoms, an alkoxy group having 1 to 4 carbon atoms, carboxyl, a nitro group, an amino group or hydroxyl, X' is independently a halogen atom, an alkyl group having 1 to 4 carbon atoms, an alkoxy group having 1 to 4 carbon atoms, carboxyl, a nitro group or an amino group and n is an integer of 0 to 7.

2. A pigment dispersion comprising the pigment composition recited in claim 1 and a vehicle prepared by dissolving a resin in an organic solvent.

3. A pigment dispersion according to claim 2, wherein the resin is at least one member selected from the group consisting of gum rosin, wood rosin, tall oil rosin, rosin ester, lime hardened rosin, zinc hardened rosin, maleinated rosin, fumarated rosin, nitrocellulose, ethylcellulose, polyamide, polyurethane, cyclized rubber and chlorinated rubber.

4. A pigment dispersion according to claim 2, wherein the organic solvent is at least one member selected from an aromatic hydrocarbon, an aliphatic hydrocarbon, an ester and a ketone.

5. A pigment dispersion according to claim 2, wherein the monoazo lake pigment is contained in an amount of 5 to 70% by weight based on the pigment dispersion.

* * * * *